April 21, 1959  W. B. DEAN  2,882,836
INTERIOR LINING AND BAGGAGE RACK FOR VEHICLES
SUCH AS RAILWAY CARS AND THE LIKE
Filed May 15, 1956  6 Sheets-Sheet 1
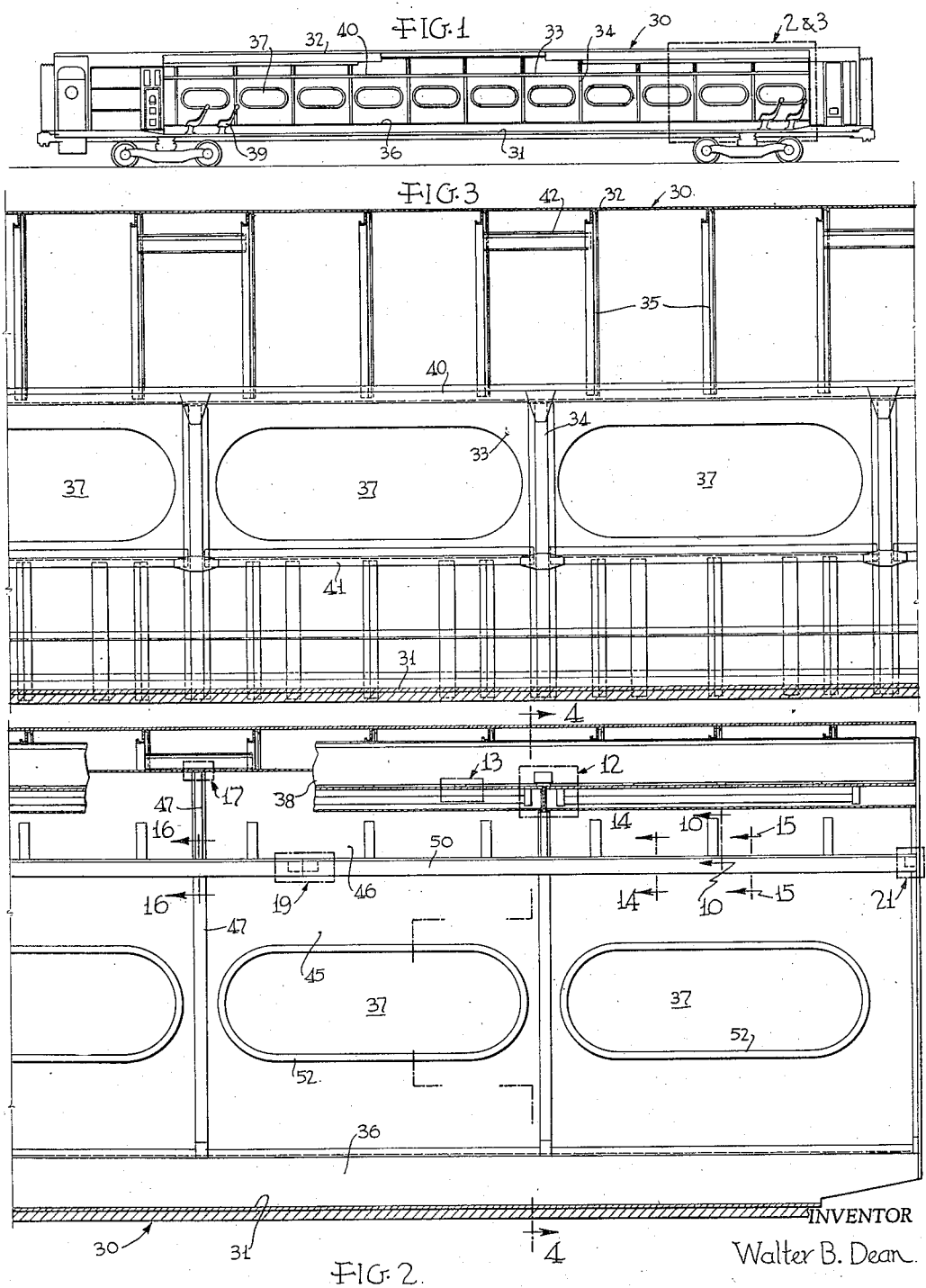
INVENTOR
Walter B. Dean
BY
Wm. R. Glisson
ATTORNEY

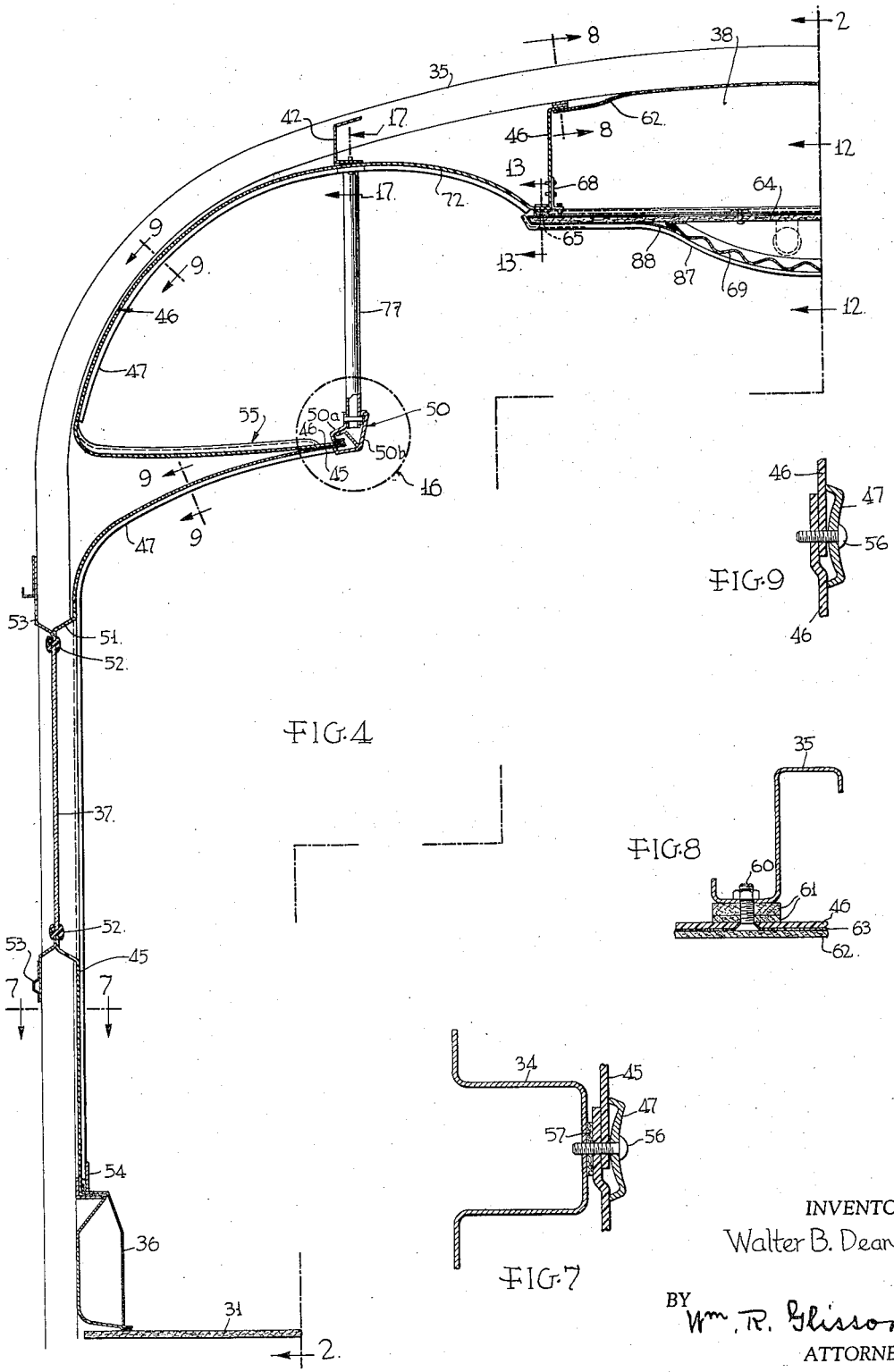

April 21, 1959 W. B. DEAN 2,882,836
INTERIOR LINING AND BAGGAGE RACK FOR VEHICLES
SUCH AS RAILWAY CARS AND THE LIKE
Filed May 15, 1956 6 Sheets-Sheet 5
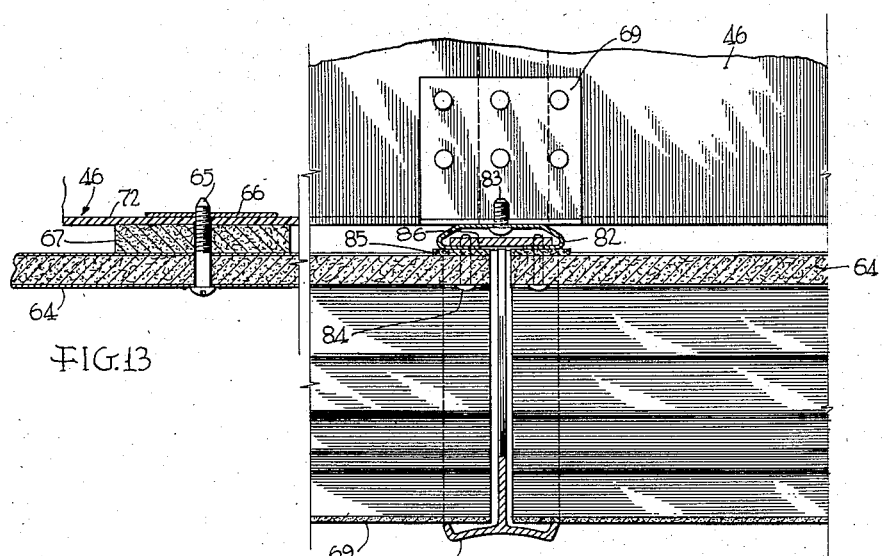
FIG.13
FIG.12.
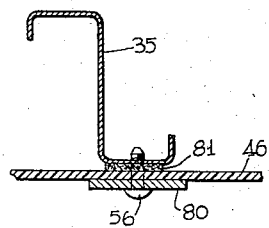
FIG.11
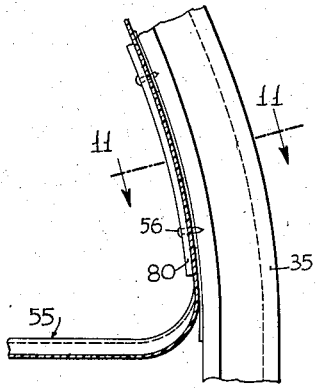
FIG.10
INVENTOR
Walter B. Dean.
BY Wm. R. Glisson
ATTORNEY April 21, 1959 W. B. DEAN 2,882,836
INTERIOR LINING AND BAGGAGE RACK FOR VEHICLES
SUCH AS RAILWAY CARS AND THE LIKE
Filed May 15, 1956 6 Sheets-Sheet 6

INVENTOR
Walter B. Dean

BY Wm. R. Glisson
ATTORNEY

United States Patent Office 2,882,836
Patented Apr. 21, 1959

2,882,836

INTERIOR LINING AND BAGGAGE RACK FOR VEHICLES SUCH AS RAILWAY CARS AND THE LIKE

Walter B. Dean, Narberth, Pa., assignor to The Budd Company, Philadelphia, Pa., a corporation of Pennsylvania Application May 15, 1956, Serial No. 584,972

7 Claims. (Cl. 105—329)

This invention relates to an interior lining and baggage rack installation for vehicles, such as rail cars and the like, and has for an object the provision of improvements in this art.

One of the particular objects of the invention is to provide inside lining for vehicles which is easy to install and secure in place.

Another object is to provide inside lining for vehicles which comprises only a few panels of simple design which can readily be formed of plastics, such as glass fiber and a plastic binder, and simple fastening means for the panels.

Another object is to provide inside lining for vehicles in which the panels frame the windows.

Another object is to provide inside lining for vehicles in which the panels form the baggage racks.

Another object is to provide inside lining for vehicles in which the ceiling panels form part of an air duct as well as part of the baggage rack.

Another object is to provide inside lining for vehicles in which an improved joint and connection cover is used.

Another object is to provide inside lining for vehicles in which the panel connecting means is connected to the stanchion rods which support the edge of the baggage rack.

The above and other objects and various novel features of the invention will be apparent from the following description of an exemplary embodiment, reference being made to the accompanying drawings, wherein:

Fig. 1 is an inside longitudinal elevation of a railway car embodying the present invention;

Fig. 2 is an enlarged partial elevation taken in the zone 2–3 of Fig. 1, some parts being shown in section;

Fig. 3 is an enlarged partial elevation, with the inside lining removed, taken in the zone 2–3 of Fig. 1, some parts being shown in section;

Fig. 4 is a further enlarged transverse vertical section taken on the line 4—4 of Fig. 2;

Fig. 7 is a partial enlarged horizontal section taken on the line 7—7 of Fig. 4;

Fig. 8 is a partial enlarged section taken on the line 8—8 of Fig. 4;

Fig. 9 is a partial enlarged section taken on the lines 9—9 (two locations) of Fig. 4;

Fig. 10 is a partial enlarged vertical transverse section taken on the line 10—10 of Fig. 2;

Fig. 11 is an enlarged section taken on the line 11—11 of Fig. 10;

Fig. 12 is an enlarged vertical longitudinal section taken on the line 12—12 of Fig. 4 and in the area 12 of Fig. 2;

Fig. 13 is an enlarged vertical longitudinal section taken on the line 13—13 of Fig. 4;

Figure 5:
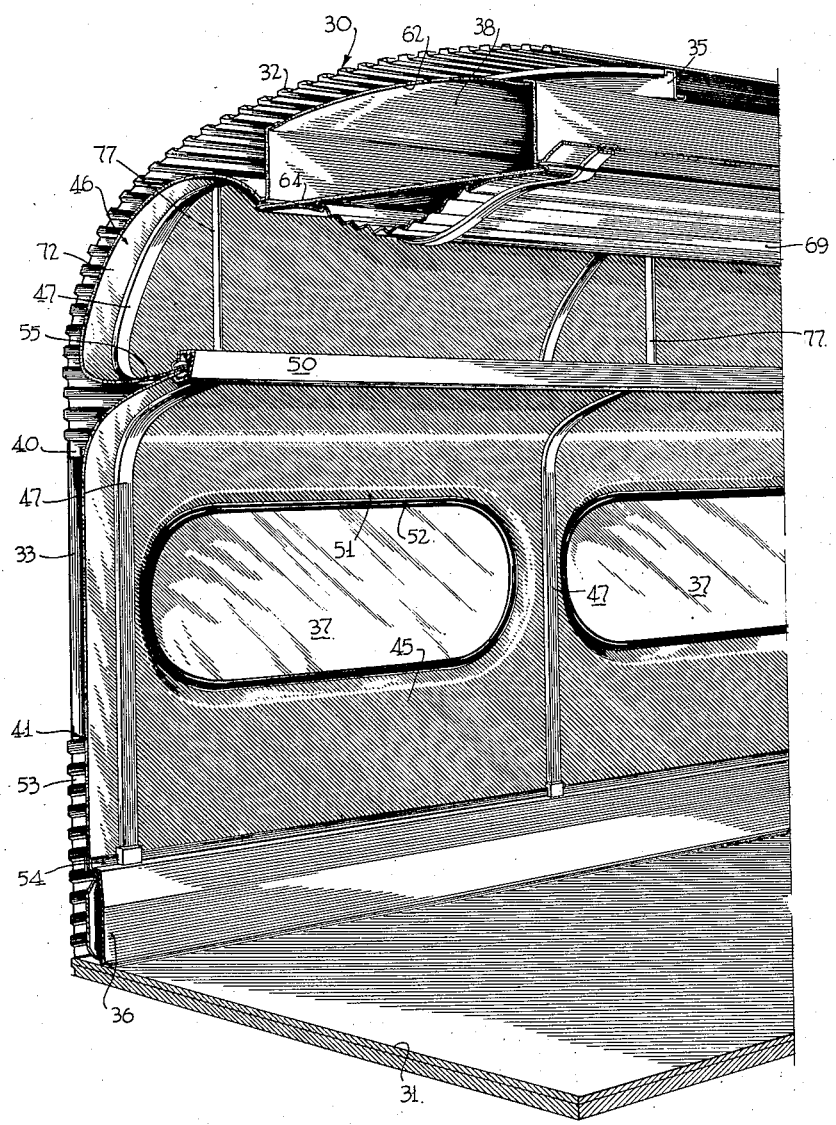
Fig. 5 is an enlarged inside perspective with the near end cut in vertical transverse section.

The installation, in general, comprises a plurality of lower side wall panels which extend from the lower portion of the outer side wall, as from the radiator cover, up past the windows, with indented openings which frame the windows, and in a smooth curve upward and inward toward the aisle to form the lower portion of a baggage rack, a plurality of upper panels which extend down from the roof to form a side of an air duct, then extend upward, outward and downward to form a ceiling, and finally extend inward to form the upper part of a baggage rack, and suitable mountings, fastenings and connections for the panels, especially a joint connection for the lower and upper panels which forms a smooth rail for the baggage rack and provides connections for the stanchion posts which support the inner edge of the baggage rack from the roof.

The invention is shown to be embodied in a railway car 30 having a floor 31, a roof 32, outer sidewalls 33, sidewall posts 34, roof carlines 35, radiator enclosures 36, windows 37, and a central overhead air duct 38. Fig. 1 shows seats 39, of the coach type, adjacent the windows on each side, an aisle being left between seats on opposite sides. The car frame also includes (Fig. 3) longitudinal members, such as purlins 40, horizontal members 41 below windows, longitudinal roof members 42, and others.

The inside lining includes lower panels 45, upper panels 46, joint cover strips 47, and a baggage rack inner rail and joint strip generally designated by the numeral 50.

The lower panels 45, in normal arrangement, extend from center to center of the spaces between windows and each panel has an indented portion 51 which frames the window and has an opening to receive the window pane. A rubber mounting strip 52, preferably of the wedge filler sealing type, mounts the pane within its inner side and embraces the panel opening edge and the opening edge of the outer sheathing 53 at its outer side.

Figure 6:
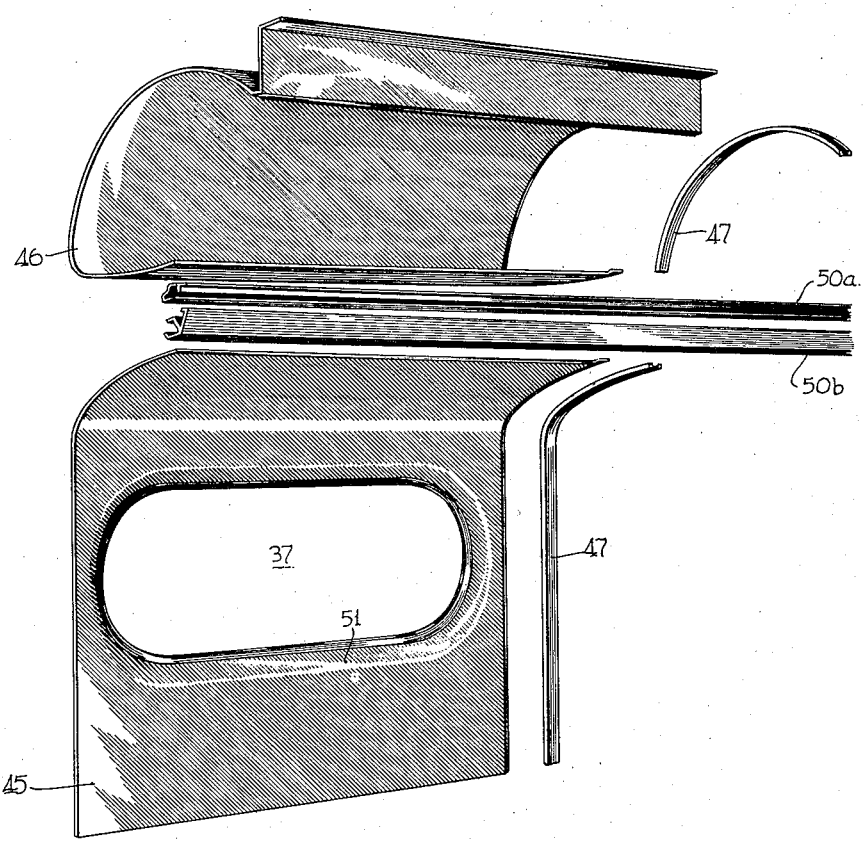
Fig. 6 is an exploded perspective of a portion of the structure shown in Fig. 5.

A strip 54 covers the lower ends of the panels at the radiator cover. As shown in Figs. 5, 6 and 7, a joint cover strip 47 extends the full length of the lower panels from the top of the radiator cover and strip 54 to the edge of the baggage rack 55 at the rail 50. The adjacent edges of the panels are offset to overlap, as shown in Fig. 7, and are secured to the posts 34, as by screws 56, a noise reducing strip 57, as of felt, rubber or the like, being secured between the panels and the post.

Where the panels form the bottom portion of the baggage rack, as shown in Fig. 9, it is not necessary to secure the screws 56 to a metal inner anchorage if screws with deep threads, like sheet metal screws, are used but metal backing elements may be used if desired. For example, brackets secured to the car side framing could extend out into the interior space of the baggage rack if desired. Such brackets are used at least at the ends. If brackets are not used or if they are open along the length of the car, the baggage rack space may be used for ducts, as for pipes, wiring, air evacuation, etc., as may be desired.

The upper panels 46, as shown in Fig. 8, are secured to the carlines by bolts 60, padding material 61, as of felt, rubber or the like, being interposed, and an upper air duct lining panel 62 is secured over the assembly in sealed relationship, as by adhesive 63.

The vertical portion of the panel 46 forms one side of the air duct 38 and supports the bottom assembly 64 of the air duct (Fig. 13) by screws 65 anchored in inner plates 66, there being padding material 67 interposed at securement points between lower openings from the duct. Angle strips 68 (Fig. 4) assist in supporting the bottom assembly 64.

A lighting duct enclosure 69, as of translucent corrugated material, is also secured in the assembly. The bottom assemblies 64 carry the lighting fixture units, lamp tube sockets, ballast starters, wiring, etc., so that in effect the panels act as combination bottom closures for the duct and as lighting fixtures which can be quickly mounted or removed.

Figure 17:
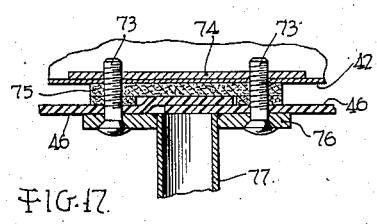
Fig. 17 is an enlarged vertical longitudinal section of parts shown in the zone 17 of Fig. 2.

From the air duct the upper panel 46 curves upward and outward and then downward to form the ceiling portion 72. As shown in Figs. 4 and 17, the panels 46 lap between carlines and are secured to the longitudinal beam 42 by bolts 73 which thread into a back tapping plate 74, a packing strip 75 of felt, rubber or the like being interposed in the assembly. The bolts also secure a plate 76 to which the upper end of a stanchion post 77 is secured, as by welding. At their lower ends the stanchion posts support the aisle edge of the baggage rack, as will be explained.

At other points where there is no load the panels 46 are secured together in overlapped relation by the joint cover strip 47 and screws 56, as shown for the lower panels at the underside of the baggage rack in Fig. 9. For this reason the section line 9—9 is shown at the two locations in Fig. 4.

Where the panel 46 lies along a carline it is anchored to prevent noise and hold it in shape. As shown in Figs. 10 and 11, a strip 80 is secured over the panel, as by screws 56, padding strips 81 being interposed between the panel and the carline.

As shown in Fig. 12, the duct bottom panels 64 are supported by light transverse beams 82 secured to the angle strips 69 by screws 83, the panels being secured to the beams by screws 84 with padding strips 85 interposed and tapping plates 86 being provided for the screws. The lighting duct panels 69 are supported at their ends by joint strips 87 which are anchored at their ends by screws 65 like those shown in Fig. 13 for the panels 46 and other parts. At their side edges the panels 69 are secured in the grooves of trim strips 88 carried by the bottom panels 64.

The panels 46 depart from the outer wall in a general horizontal span extending toward the aisle and this portion is preferably corrugated transversely for rigidity and strength, the corrugations or ribs extending around the curved bend in the panel and tapering out along the sidewall, as shown in Figs. 4 and 10.

The arrangement at the aisle edge of a baggage rack is shown in Figs. 14–16 and 19–22. The joint strip and rail 50 is a longitudinally divided unit comprising an upper rail strip 50a and a lower rail strip 50b. The upper rail strip serves mainly as a structural element and the lower serves mainly as an ornamental cover element although in the final assembly it contributes greatly to the beam strength of the composite rail. Both may be made of extruded sections, as of aluminum.

Figure 22:
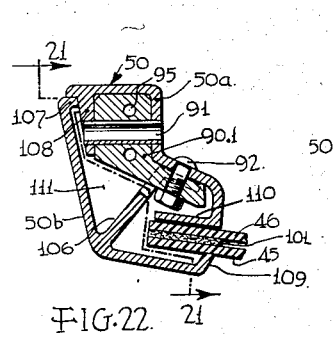
Fig. 22 is a vertical transverse section taken on the line 22—22 of Fig. 21.
Figure 21:
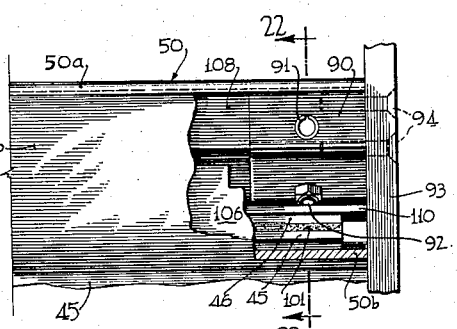
Fig. 21 is an enlarged longitudinal and generally vertical section taken in the zone 21 of Fig. 2.

As shown in Figs. 21 and 22, the upper rail strip 50a is secured at its ends by anchor blocks 90 which fit inside the hollow sectional shape and which are connected to the strip by tubular drive pins 91 forced into mating aligned transverse holes and by bolts 92 fitting in other holes. The anchor blocks 90 are secured to the car end wall members 93, as by screws 94 which are threaded into holes 95 in the blocks.

Figure 20:
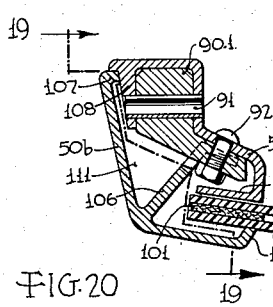
Fig. 20 is a vertical transverse section taken on the line 20—20 of Fig. 19.
Figure 19:
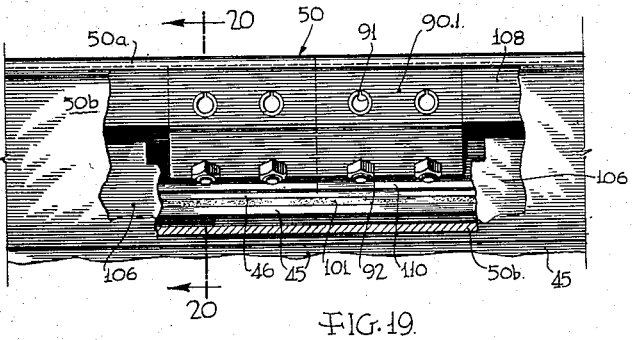
Fig. 19 is an enlarged longitudinal and generally vertical section taken in the zone 19 of Fig. 2, the view also being taken on the line 19—19 of Fig. 20.

At joints between lengths of the upper rail strip 50a, as shown in Figs. 19 and 20, blocks 90.1, which are formed of the same extrusions as the blocks 90, secure the ends of the rail strips together, the securement being made, as before, by tubular drive pins 91 and bolts 92.

Figure 16:
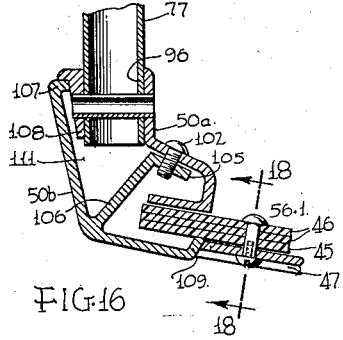
Fig. 16 is a partial enlarged vertical transverse section taken on the line 16—16 of Fig. 2.
Figure 18:
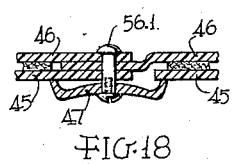
Fig. 18 is a longitudinal and generally vertical section taken on the line 18—18 of Fig. 16.

As shown in Fig. 16, a stanchion post 77 is secured to the rail strip 50a by a drive pin 91, the post first being entered into a hole 96 provided therefor in the rail strip.

Figure 14:
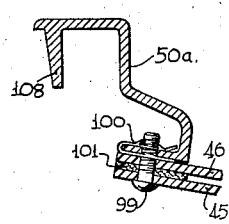
Fig. 14 is a partial enlarged vertical transverse section taken on the line 14—14 of Fig. 2.
Figure 15:
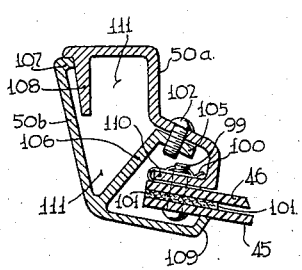
Fig. 15 is an enlarged vertical transverse section taken on the line 15—15 of Fig. 2.

The adjacent parallel edges of the lower panel 45 and the upper panel 46 are secured to the upper rail strip, as by bolts 99 and quick action "Tinnerman" units 100, a padding strip 101 being interposed, as shown in Figs. 14 and 15.

Also as shown in Fig. 15, the lower rail strip 50b is secured at intervals to the upper rail strip 50a, as by screws 102. The screws are received by threaded holes in a flange 105 of an intermediate upstanding rib 106 formed on the lower rail strip 50b. When the screws 102 are tightened they pull an inturned upper flange 107 of the lower rail strip 50b against the side of a depending rib 108 of the upper rail strip 50a. This causes an upturned flange 109 on the other edge of the lower rail strip to engage and clamp the panel edge assembly to the inturned flange 110 of the upper rail strip, this being the part in which the bolts 99 are anchored. Double headed sleeve screws 56.1 secure the strips 47 at the edge of the rail 50, the upper smooth head avoiding damage to baggage placed on the baggage rack.

The hollow longitudinal space 111 within the rail assembly, comprising strips 50a and 50b, may be used for wiring and the like.

All fastenings are thus hidden from view and the rail presents a smooth neat appearance.

It is thus seen that the invention provides an interior lining which is simple and pleasing in appearance, which is easy to install, which frames the windows in smooth easily cleaned lines, which forms the air duct and baggage rack, and which provides a panel binding stanchion-supported rail which is easily assembled, which conceals the fastenings when assembled and which is of a neat and pleasing appearance.

The surfaces of the plastic panels may be pigmented in any desired color as they are laid down and this avoids the need to use any paint after assembly.

While one embodiment of the invention has been described for purposes of illustration it is to be understood that there may be various modifications and changes within the limits of the invention.

What is claimed is:

1. An interior construction for vehicles, such as railway cars, buses, aircraft, and the like, which have sidewalls with windows, floor, and roof, comprising, in combination, a lower lining panel extending as an integral unit from a point below the windows up the sidewall past the windows and thereabove turned inward away from the sidewall to form the bottom of a baggage rack, said lower panel having a window opening therein, an upper panel extending as an integral unit along the roof and sidewall and turned inward away from the sidewall above the inturned portion of the lower panel to form the top portion or floor of the baggage rack, the inner edges of said inwardly extending portions of said upper and lower panels being brought into juxtaposition, a longitudinally extending rail covering said juxtaposed panel edges, and means securing said juxtaposed edges and rail together.

2. An interior construction for vehicles, such as railway cars, buses, aircraft, and the like, which have sidewalls with windows, floor, and roof, comprising in combination, a lower lining panel extending as an integral unit from a point below the windows up the sidewall past the windows and thereabove turned inward away from the sidewall to form the bottom of a baggage rack, said lower panel having a window opening therein, an upper panel extending as an integral unit along the roof and sidewall and turned inward away from the sidewall above the inturned portion of the lower panel to form the top portion or floor of the baggage rack, the inner edges of said inwardly extending portions of said upper and lower panels being brought into juxtaposition, a longitudinally extending rail covering said juxtaposed panel edges, and means securing said juxtaposed edges and rail together, said lower panel being formed with an indented peripheral margin around the window opening and said rail being formed of longitudinally divided parts secured together over the juxtaposed edges of said panels.

3. An interior construction as set forth in claim 2, further characterized by the fact that the sidewall is provided with sheathing having a window opening therein matching the opening in said lower panel, the lower panel and sheathing having juxtaposed marginal edges surrounding said window opening, and grooved rubber molding embracing said juxtaposed edges of the lower panel and sheathing around the window opening at its peripherally outer side and mounting a window pane interiorly.

4. An interior construction as set forth in claim 1, further characterized by the fact that the inwardly extending portion of the upper panel which forms the floor of the baggage rack is formed with transverse stiffening ribs which extend around the curved bend in the panel and taper out along the sidewall.

5. An interior construction for vehicles, comprising in combination, upper and lower panel means forming a baggage rack and presenting an inwardly extending thin edge portion, a longitudinally divided rail including mating parts embracing and enclosing the panel edge portion, means for securing said rail parts together and to said baggage rack panel edge portion, and means supporting the upper rail part from the upper portion of the vehicle.

6. An interior construction for vehicles, comprising in combination, panel means forming a baggage rack and presenting an inwardly extending thin edge portion, and a longitudinally divided rail including mating parts embracing and enclosing the panel edge portion, and means for securing said rail parts together and to said baggage rack panel edge portion, the upper rail part having a generally horizontal flat portion at one edge to which said panel edge is secured and a generally vertical flat portion at its other edge, and the lower rail part being angle-shaped in cross section and having inturned flanges at its edges so spaced and arranged that they are directed toward the horizontal and vertical flat portions of said upper rail part in assembly, said means for securing said rail parts together being so located and arranged as to draw the flanges of the lower rail part toward the flat portions of the upper rail part.

7. An interior construction for vehicles, comprising in combination, panel means forming a baggage rack and presenting an inwardly extending thin edge portion, and a longitudinally divided rail including mating parts embracing and enclosing the panel edge portion, and means for securing said rail parts together and to said baggage rack panel edge portion, the rail parts being angular in cross section, the lower rail part having an interior rib between its edges directed toward and having a surface lying near a wall of the upper rail part, and means for securing said rail parts together forming a connection between said interior rib of the lower rail part and the adjacent wall portion of the upper rail part.

References Cited in the file of this patent

UNITED STATES PATENTS

| | | |
|---|---|---|
| 2,251,050 | Hagerty et al. | July 29, 1941 |
| 2,263,063 | Allen | Nov. 18, 1941 |
| 2,264,637 | Landell | Dec. 2, 1941 |